United States Patent [19]

Hershberger

[11] Patent Number: 4,547,139
[45] Date of Patent: Oct. 15, 1985

[54] TIRE MOLD

[75] Inventor: James B. Hershberger, Cresaptown, Md.

[73] Assignee: The Goodyear Tire & Rubber Company, Akron, Ohio

[21] Appl. No.: 682,398

[22] Filed: Dec. 17, 1984

[51] Int. Cl.$^4$ .............................................. B29H 5/02
[52] U.S. Cl. ............................ 425/28 D; 425/192 R; 425/195; 425/DIG. 5; 425/DIG. 107
[58] Field of Search ................... 425/28 R, 28 D, 35, 425/44, 182, 192 R, 193, 195, DIG. 5, DIG. 107

[56] References Cited

U.S. PATENT DOCUMENTS

| | | | |
|---|---|---|---|
| 1,567,402 | 12/1925 | Venn | 425/35 |
| 1,969,083 | 8/1934 | Lawson | 425/28 D X |
| 2,296,016 | 9/1942 | Bostwick | 425/28 D |
| 3,518,335 | 6/1970 | Jablonski | 425/44 X |
| 3,562,861 | 2/1971 | Youngblood | 425/28 D X |
| 3,894,825 | 7/1975 | Westermann | 425/195 |
| 4,184,835 | 1/1980 | Talbot | 425/DIG. 5 |

Primary Examiner—J. Howard Flint, Jr.
Attorney, Agent, or Firm—M. W. Goodwin

[57] ABSTRACT

Novel and improved means for retaining an indicia forming member on a tire mold. The structure for accomplishing this involves a latch mechanism which is operable both to selectively latch the indicia forming member to the mold and to assist in the ready removal of the member from the tire mold.

11 Claims, 12 Drawing Figures

TIRE MOLD

This invention relates to molds for curing tires and more specifically to novel and improved means for releasably retaining an indicia forming member on a portion of such a mold.

In the molding of tires it is common place to provide various forms of indicia on the sidewall of the tire. With respect to a given tire design it may not be necessary or desirable to change certain indicia for the life of the mold. On the other hand for indicia such as serial numbers or the like it may be desirable, or necessary, to provide some means to be able readily to change such indicia with respect to groups of or individual tires.

Various means have been suggested in the past to accomplish the replacement of indicia forming members, such as coverplates or slugs, in tire molds. It is the object of this invention to provide novel, improved and simpler means for removing the indicia forming member and replacing it with a different indicia forming member.

This and other objects, aspects and features of the invention will be apparent from the following description and accompanying drawings in which.

Figure 1:
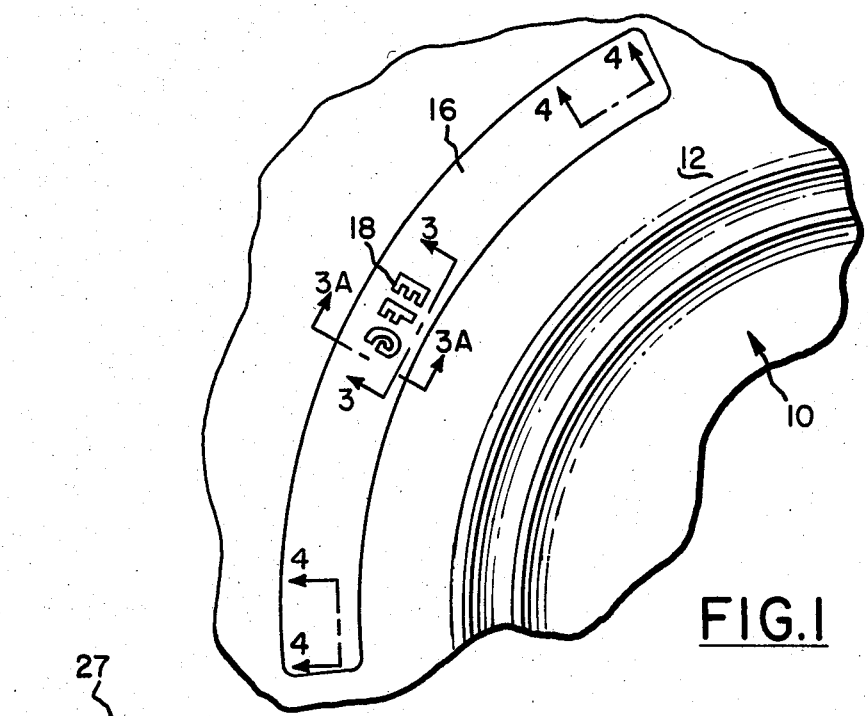
FIG. 1 is a fragmentary view of a portion of a tire mold carrying an indicia forming member.
Figure 4A:
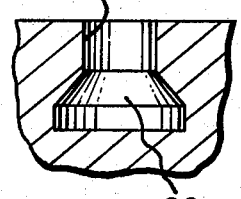
FIG. 4A is an enlarged, fragmentary side view of the keyhole slot of FIG. 2 taken substantially along the lines 4A—4A of FIG. 2.
Figure 2:
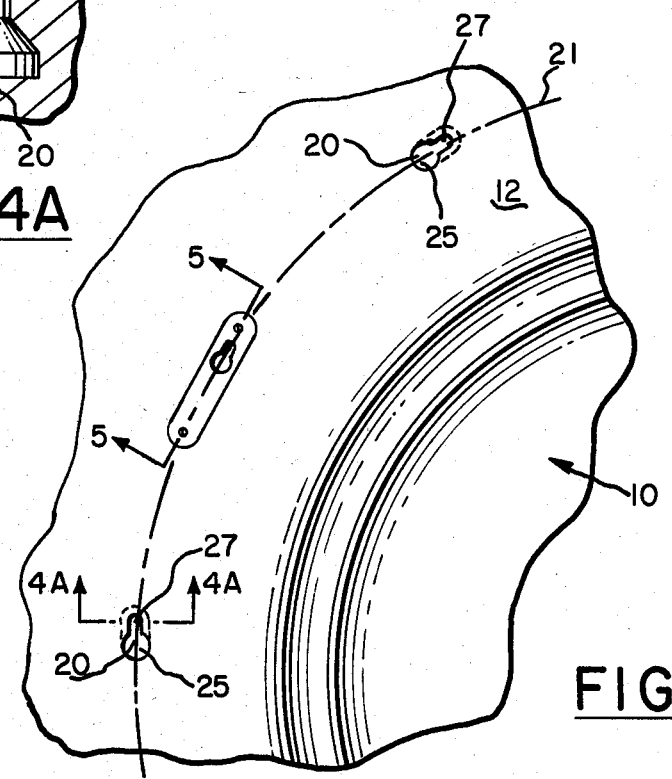
FIG. 2 is a fragmentary view of the mold of FIG. 1 with the indicia forming member removed.
Figure 3:
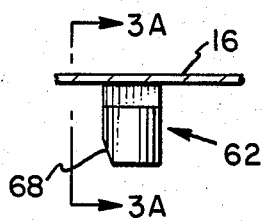
FIG. 3 is an enlarged, fragmentary, side view of the indicia forming member of FIG. 1 taken substantially along the line 3—3 of FIG. 1.

With reference to the drawings, and particularly FIGS. 1 and 2, the present invention comprises a tire mold including a mold member 10 having a surface 12 which is engageable with a portion of a tire to form a surface on the tire during the tire vulcanizing or curing operation. More specifically, in the specific embodiment shown, the surface 12 will form at least a portion of the exterior surface of a sidewall of a tire. The surface 12 is a surface of revolution having an axis corresponding to the axis of revolution of a tire cured in the mold. It is to be understood that while the specific embodiment is being described in connection with an external sidewall surface of a tire. The invention is readily adaptable to other situations and apparatus wherein any portion of a tire or tire component is being formed.

As shown in FIG. 1, attachable to the mold member 10 is an indicia forming member or coverplate 16. The coverplate 16 is provided with indicia forming means such as shown at 18 in FIG. 1. Such indicia forming means may be projections extending from the coverplate 16 or recesses in the coverplate 16 depending on whether it is desirable to have the indicia which is formed on the tire to be depressed or raised.

Figure 4:
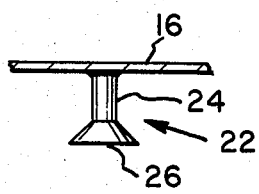
FIG. 4 is an enlarged, fragmentary side view of the indicia forming member of FIG. 1 taken substantially along the lines 4—4 of FIG. 1.
Figure 3A:
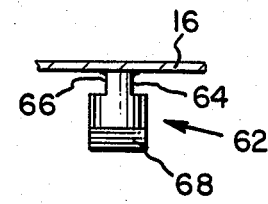
FIG. 3A is an enlarged, fragmentary, side view of the indicia forming member of FIG. 1 taken substantially along the line of 3A—3A of FIG. 1.

As shown in FIG. 2, the mold member 10 is provided with a pair of keyhole slots 20 spaced apart a predetermined distance angular about the axis of revolution of the surface 12 along the line 21. The coverplate 16 is provided, as shown in FIG. 4, with a projection 22 located adjacent each end thereof. Each projection 22 extends from the side of the coverplate opposite that which carries the indicia forming elements 18. Each projection or keeper 22 has a cylindrical portion 24 fixed at one end to the coverplate 16 and extending from the coverplate at right angles to the general plane thereof. The outer end of each portion 24 terminates in an enlarged portion 26. The diameter and configuration of each enlarged portion 26 is such that it will fit freely within the enlarged portion 25 of one of the keyhole slots 20 in the mold member. The diameter of the portion 24 of each projection 26 is selected so that the portion 24 is slidably receivable within the narrower portion 27 of a keyhole slot 20. The keyhole slots 20 are oriented in the mold member and spaced apart a distance, along the line 21 shown in FIG. 2, corresponding to the spacing of the projections 22 on the coverplate, such that when the coverplate is moved toward the mold member 10, the projections 22 will enter and be received in the enlarged portions 24A of these slots. Thereafter, translation of the coverplate in one direction will move the cylindrical portions 24 of the projections into the narrower portions 27 of the slots 20 so that coverplate is retained on the mold member 10 in a well known manner.

Figure 5:
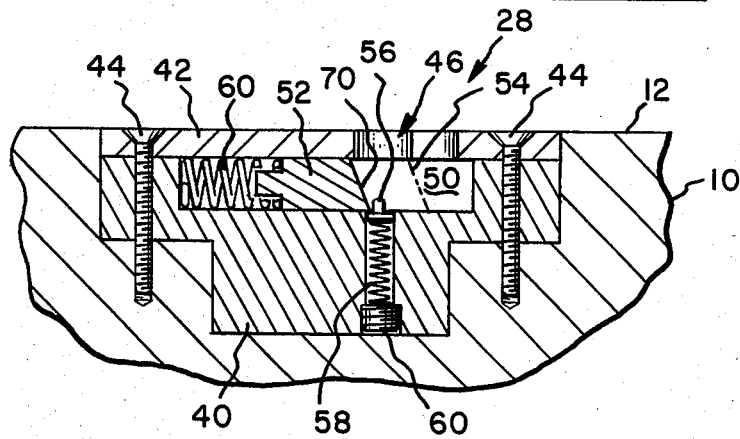
FIG. 5 is an enlarged, fragmentary, cross-sectional view taken substantially along the lines of 5—5 of FIG. 2.
Figure 6:
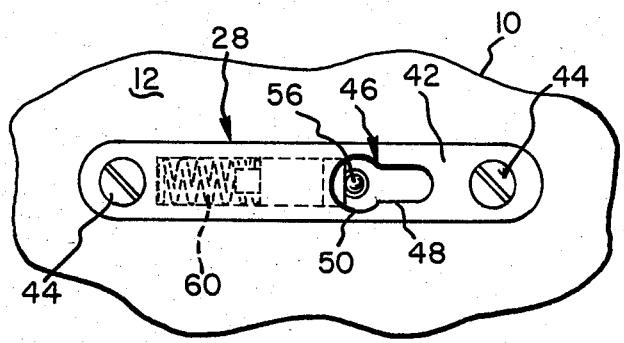
FIG. 6 is an enlarged, plan view of a portion of FIG. 2.

In order to provide selective retention of the coverplate 16 on the mold member 10, latching means in the form of a latch mechanism, generally indicated at 28 in FIGS. 5 and 6, is provided. The latch mechanism 28 comprises a body portion 40 receivable within a recess or opening in the mold member 10 which extends from the surface 12 of the mold member. The recess receiving the body 40 of the latch is disposed approximately mid way between the keyhole slots 20 as measured along the line 21 shown in FIG. 2. The latch mechanism 28 further comprises a plate 42 seated on top of the body 40 and releasably secured thereto by a pair of screws 44. The plate 42 closes the recess in the mold member in which the body 40 of the latch mechanism is received except for a keyhole slot 46 in the plate 42 similar to the keyhole slots 20 and oriented in the same manner as the keyhole slots 20. In other words, and as shown in FIG. 2, the narrower portion 48 of the slot 46 extends from the enlarged portion 50 thereof in the same direction along the line 21 as the narrower portions 27 of the slots 20 extend from the enlarged portions thereof.

The latch mechanism 28 is provided with a recess 50 which in conjunction with the plate 42 provides a chamber 50 within the body 40. Slidably received within the chamber 50 are cam means in the form of a slide 52 mounted for movement in a direction in alignment with the narrow portion 48 of the keyhole slot 46 in the plate 42. The slide is movable between a retracted position shown in full line in FIG. 5 and a latching position shown in broken line at 54 in FIG. 5. The slide 52 is retained in its retracted position by a spring loaded detent 56 which extends coaxially of the enlarged portion 50 of the keyhole slot 46 and is received within an opening in the body 40 of the latch mechanism. The spring 58 for the detent 56 is received within the same opening as is the detent. The end of the opening receiving the detent and spring is closed at the end thereof opposite the detent by a set screw 60, which also serves to preload the spring 58 to urge the detent toward the chamber 50.

The slide 52 is maintained in its retracted position shown in FIGS. 5 and 6 by the detent 56 one end of which is urged into the recess 50 and into obstructing relation with the slide 52 to prevent movement of the slide in a direction toward the narrower portion 48 of the keyhole slot 46. A preloaded spring 60 is engaged between the end of the slide 52 opposite the detent 56 and a wall of the chamber 50 and urges the slide 52 in a direction toward the narrower portion 48 of the keyhole slot 46. The free length of the spring 60 is such that when the slide 52 is in its latching position, the spring 60 will still preload the slide sufficiently for a purpose to be later described.

A projection or keeper 62 is carried by the coverplate 16. The keeper 62 extends from the side of the coverplate opposite the indicia forming portion 18 of the insert and is positioned between the projections 22 such that when the enlarged ends 26 of the projections 22 are positioned in registry with the enlarged portions of the keyhole slots 20 the keeper 62 will be in registry with the enlarged portion 50 of the keyhole slot 46 in the top plate 42 of the latch mechanism 28. The keeper 62 extends from the coverplate 16 at right angles to the general plane thereof and has a generally cylindrical cross-section. The keeper 62 at the end thereof next adjacent the coverplate 16 is cutaway, or formed, to provide parallel surfaces 64, 66. When the coverplate is located such that the projections 22 and 62 are in registry with the enlarged portions of their respectively associated keyhole slots, the surfaces 66 and 64 will be parallel to the sidewalls of the narrower portion 48 of the keyhole slot 46. Additionally, the surfaces 64 and 66 are spaced apart a distance only slightly less than the spacing of the sidewalls of the narrow portion 48 of the slot 46. Thus it will be seen that the forming of the surfaces 64, 66 on the projections 62 effectively provides a pair of slots formed in part by the projections 62 and in part by the coverplate 16 with such slots being adapted to slidably receive the bordering edge portions of the narrower portion 48 of the slot 46. The projection 62 is further provided at the end thereof opposite the spring 60 with an inclined cam surface 68 which lies in a plane extending at right angles to the planes of the surfaces 64, 66. The surface 68 cooperates with a similarly inclined surface 70 provided by the end of the slide 52 opposite the spring 60. In the specific embodiment shown, the surfaces 68 and 70 are inclined at an angle of 20 degrees to the axis of the circular enlarged portion 50 of the keyhole slot. The cam surface 68 is inclined from the end thereof next adjacent the bottom of the recess 50 in the direction of movement of the slide 52 from its latching to retracted position.

To mount the coverplate 16 on the mold member 10, the coverplate is positioned with the enlarged portions of the projections 22 and 62 disposed in the enlarged openings of their respectively associated keyhole slots. The center portion of the coverplate is then pressed toward the mold member whereby the distal end of the projection 62 will engage the detent 56 so that in response to further movement of the coverplate toward the mold member 10, the detent 56 will be depressed sufficiently against the force of the spring 58 to permit the spring 60 to move the slide 52 in a direction toward the narrower portion 48 of the slot 46. This movement of the slide 52 will move the projection 62 into the narrower portion 48 of the slot 46 whereby the coverplate will be captured and retained on the mold member by the interrelationship of the slots 64, 66 formed by the coverplate and projection 62 and the bordering edge portions of the narrow portion 48 of the slot 46. The force of the spring 60 will maintain the projection 62 engaged with the closed end of the narrower portion 48 of the slot 46. Concommittantly with the movement of the projection 62 into the narrow end of the keyhole slot 46, the projections 22 will be moved into the narrower ends of the slots 20, whereby the end portions of the coverplate will be retained on the mold member.

To disengage the coverplate from the mold member 10, the coverplate is moved manually in a direction to move the projection 62 into registry with the enlarged portion 50 of the slot 46 and against the force of the spring 60. Upon sufficient movement of the coverplate in this direction the detent 56 will be urged outwardly into the chamber 50 and into obstructing relationship with the slide 52 to retain the slide in its retracted position shown in FIG. 5. As the coverplate is moved in a direction to release the same from the mold member, the inclined surfaces 68 and 70 on the slide and projection 62, respectively, act as camming surfaces to move the projection and thus the coverplate in a direction away from the surface 12 of the mold member 10.

An alternative embodiment of the invention is shown in FIGS. 7 through 10. As in the previously described embodiment, the mold member 10 is provided with a tire engageable and molding surface 12. The mold member 10 is further provided with a recess 114 extending inwardly of the mold member from the surface 12, and an indicia forming member or slug 116 is receivable within this recess 114. The slug or insert 116 is provided with indicia forming means 118 which, as in the case of the indicia forming means 18, may be projections or recesses on or in the insert 116. The insert 116 differs from the coverplate 16 previously described in that the insert 116 has a substantially greater thickness.

Figure 7:
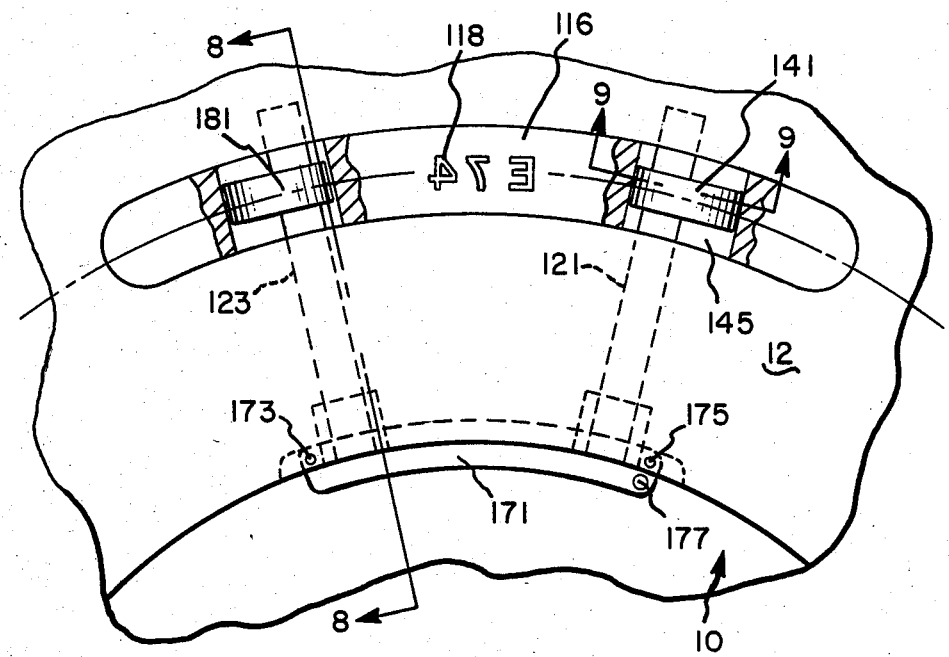
FIG. 7 is a fragmentary view of a portion of a mold incorporating an alternative embodiment of this invention.
Figure 8:
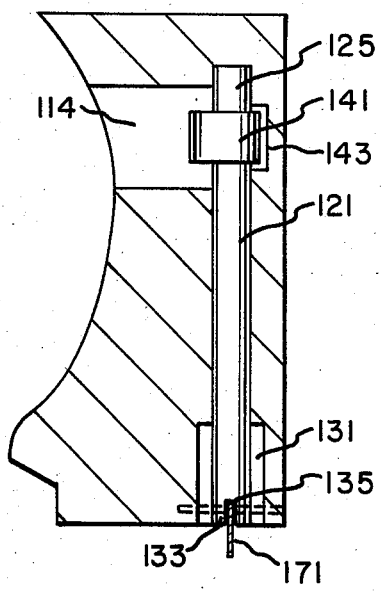
FIG. 8 is a cross-sectional view taken substantially along the line 8—8 of FIG. 7.

The insert 116 is releasably retained within the recess 114 of the mold member by a latch mechanism now to be described. The latch mechanism comprises a pair of shafts 121 and 123 rotatably carried within the mold member 10 such as shown in FIGS. 7 and 8. Each shaft extends generally along a radius to the center line of the mold which coincides with the rotational axis of a tire to be cured in the mold. As clearly shown in FIGS. 7 and 8 one end of the shaft 121 extends through the insert receiving recess 114 in the mold member and is journaled at its radially outer end portion in the mold member. The other end of the shaft extends into a recess or counterbore 131 in the mold member. The recess 131 opens outwardly of a surface of the mold member. This other end 133 of the shaft 121 is provided with a slot 135 for a purpose to be later described. Carried by the shaft 121 is a combination cam and keeper 141. The cam 141 is suitably fixed for rotation with the shaft 121 and is received within the insert receivng recess 114. In the specific embodiment shown, the insert receiving recess 114 is provided with a reduced width portion at its inner end or base portion within which the cam 141 is partially received. The reduced width portion 143 of the recess 114 serves to limit movement of the cam and thus the shaft 121 longitudily of the shaft axis to retain the shaft 121 within the mold member 10.

Figure 9:
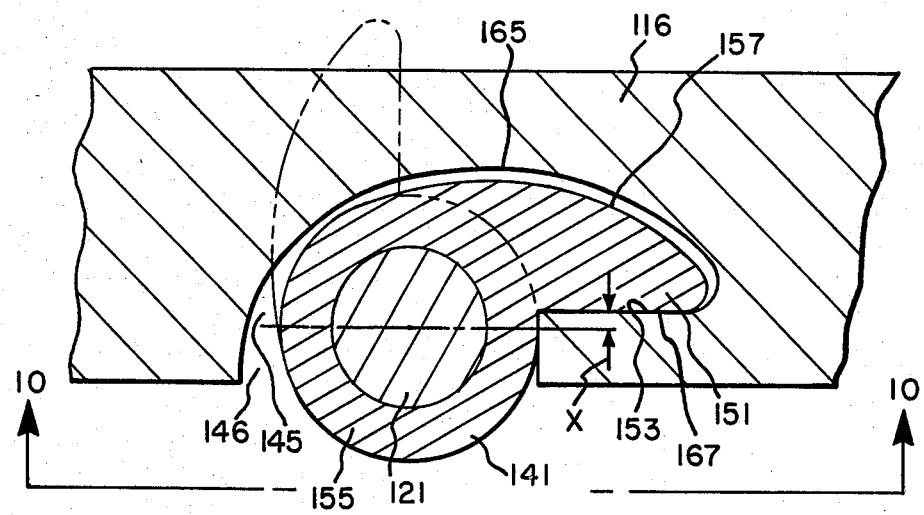
FIG. 9 is an enlarged, fragmentary view taken substantially along the line 9—9 of FIG. 7.
Figure 10:
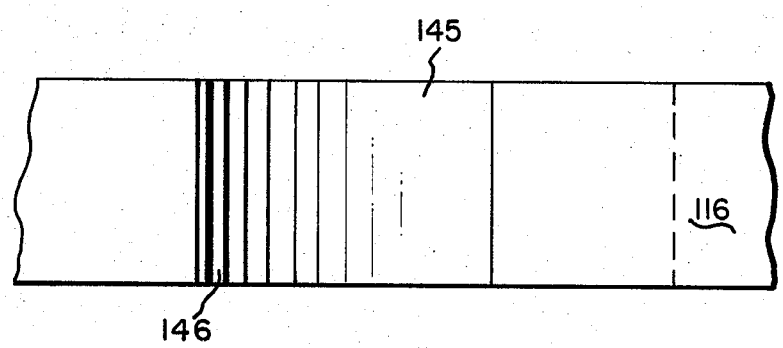
FIG. 10 is a fragmentary view taken in the direction of the line 10—10 of FIG. 9.

As best shown in FIGS. 9 and 10, the insert 116 is provided with an opening 145 which extends from one side of the insert to the other along the underside of the insert. The cam 141 and bordering edge portions of the opening 145 in the insert cooperate to provide means for releasably retaining the insert within the mold member and for assisting in removing the insert from the mold member. More particularly, the cam 141 is provided with a nose portion 151 formed in part by a flat surface 153 extending parallel to a radius of the axis of rotation of the shaft 121 and outwardly of the main body portion 155 of the cam. The flat surface 153 on the cam has a general plane extending parallel to the axis of rotation of the shaft 121. The profile of the cam member 141, at the radially outer end of the flat surface 153 merges into a curvilanear ramp 157. The ramp or cam surface 157 has a radius of curvature, relative to the axis of rotation of the cam, which progressively decreases from the nose portion of the cam over an angular distance of approximately 90 degrees about the rotational axis of the cam.

The recess or opening 145 in the insert 116 is provided with a throat portion 146 opening outwardly of the insert and communicating at its inner end with a portion of the opening 145 shaped similarly to the nose portion and ramp profile of the cam 141. More specifically, the inner wall 165 of the opening 145 in the insert is curvilinearily shaped generally to correspond to the curvilinear ramp 157 on the cam 141. The recess or opening 145 is further provided with a ledge or flat surface 167 having a general plane extending parallel to the general plane of the underside of the insert.

With the insert received within the mold recess 114 and the cam 141 received within the opening 145 in the insert, the flat surface 153 on the nose portion of the cam will be engageable in coplanar relationship with the ledge 167 on the insert to retain the insert 116 within the mold recess 114. When it is desired to remove the insert from the mold member, rotation of the shaft 121 in counter-clockwise direction, as viewed in FIG. 9, will result in the ramp 157 engaging the curvilinear surface 165 of the recess 145, whereupon continued rotation of the shaft in the same direction will tend to cam the insert out of the recess in the mold and in a direction away from the surface 12 of the mold member 10. When the cam is in the dotted line position as shown in FIG. 9 and insert will be raised sufficiently outwardly of the mold to permit grasping of the insert and completing its removal from the mold. To reduce the length of the nose portion 151 while still obtaining sufficient lift from the ramp 157, it is prepared that as shown in FIG. 9, the general plane of the flat surface 153 of the cam be spaced from the rotational axis of the cam a distance X, as shown in FIG. 9, and as a direction towards the ramp 157 or the cam. The distance X will be determined by the lift desired by the cam 141 and the thickness of the insert 116.

When it is desired to introduce a new insert into the recess 114 the shaft 121 is rotated to position the cam in its broken line position shown in FIG. 9 whereby the nose portion of the cam extends in the direction of the surface 12 of the mold and in a direction outwardly of the recess 114 in the mold. A new insert may then be moved toward the insert receiving recess 114 in the mold whereby the nose portion 151 of the cam will enter the throat portion 146 of the opening 145 in the insert. Rotation of the shaft 121 in a clockwise direction from the dotted line position shown in FIG. 9 will effect engagement between the flat surface 153 on the cam and the ledge 167 within the insert so that continued rotation of the shaft in the same direction will effectively cam the insert into the recess 114 in the mold. As noted previously, when the shaft 121 has been rotated sufficiently place the cam in its full line position shown in FIG. 9 the nose portion of the cam will tend to retain the insert within the mold. To assure that the insert is retained within the mold, and as shown in FIGS. 7 and 8, a latch member or locking key 171 is pivotly mounted at one end, as at 173, on the mold member 10. The key 173 is engageable within the slot 135 at the outer end of the shaft 121 to retain the shaft in a selected rotated position so as to maintain the cam in its full line insert latching position shown in FIG. 9. Suitable means such as a ball detent or the like is provided in the mold element 12 and cooperates with means on the key 171, such as the opening shown at 175 or FIG. 7, to retain the key in shaft locking relationship. The key 171 is further advantageously provided with an opening 177 to permit insertion of a suitable tool to disengage the key from the slot 135 and permit insertion of another suitable tool in the slot 135 to rotate the shaft 121.

The means for releasably latching one end portion of the insert 116 within the mold recess 114 has been described in connection with the shaft 121. It is to be understood that substantially identical structures are provided in cooperation and in association with the shaft 123 including a cam 181 and that substantially identical means are provided on the insert to cooperate with the cam 181 in the manner described in connection with the cam 141.

In the specific embodiment shown in FIGS. 7 through 10 the principal difference between the mechanisms associated with the shafts 121 and 123 is that the nose of the cams 141 and 181 extend generally in opposite directions, respectively, and toward the next adjacent ends of the recess 114 in the mold element 10.

In as much as many changes could be made in the above described construction without departing from the scope of this invention, it is intended that all matter contained in the above description or shown in the accompanying drawings shall be interpreted as illustrative and not in a limiting sense.

It is also to be understood that the language in the following claims is intended to cover all the generic and specific features of the invention herein described and all statements of the scope of the invention which, as a matter of language, might be said to fall therebetween.

Having described my invention, what is claimed is:

1. A tire mold including a mold member provided with a surface engageable with a portion of an uncured tire, a detachable indicia forming member engageable with a portion of an uncured tire to form indicia on a surface of the tire, and means for releasably retaining said indicia forming member on said mold, said last mentioned means being carried in part by said indicia forming member and in part by said mold member and including movable cam means carried at least by one of said indicia forming member and mold member to releasably latch said indicia forming member to said mold member.

2. A tire mold as described in claim 1, wherein said cam means is mounted for movement relative to at least said one of said indicia forming member and mold member and is engagable with the other of said indicia forming member and mold member to tend to move said indicia forming member in a direction away from said mold member in response to movement of said cam means in a predetermined direction.

3. A tire mold as described in either of claims 1 or 2, wherein said indicia forming member is provided on one side thereof with indicia forming means, a projection extending on the other side of said indicia forming member, said recess being elongated in a direction generally circumferentially of the mold member, the latching of said indicia forming member to said mold member being effective during movement of said indicia forming member general longitudinally of itself by means of a plunger member slidably mounted within the mold member for movement between a retracted and a latching position and engagable with said projection to move the indicia forming member longitudinally of itself, and means urging said plunger member in said predetermined direction.

4. A tire mold as described in claim 3, further comprising detent means carried by the mold member for releasably retaining said plunger member in its retracted position, said detent means being engagable by said projection on the indicia forming member to effect releasing of said plunger means in response to movement of said indicia forming member toward said mold member.

5. A tire mold as described in claim 4 wherein said plunger member includes an inclined surface forming cam means engagable with said projection to urge said projection in a direction away from said mold member in response to a movement of said indicia forming member longitudinally of itself and in a direction opposite said predetermined direction.

6. A tire mold as described in claim 5, wherein said mechanical latch means includes a keyhole slot defined by means carried by said mold member, and means formed in part by said projection and engagable with the narrower portion of said keyhole slot to maintain said indicia forming member on said mold member.

7. A tire mold as described in claim 6, wherein said indicia forming member includes additional projections extending from the side thereof opposite said indicia forming means and having, means cooperable with additional keyhole slot means provided in said mold member to assist in retaining said indicia forming member on said mold member in response to movement of indicia forming member in said predetermined direction.

8. A tire mold as described in either of claims 1 or 2, wherein said last mentioned means comprises a cam member carried by the mold member and rotatably mounted for movement between a latching and an unlatching position, said indicia forming member being provided with a recess insert within which said cam member is receivable, cooperating means on said cam member and indicia forming member engagable to effect movement of said indicia forming member in a direction inwardly of said recess in response to movement of said cam member from said unlatching position and toward said latching position.

9. A tire mold member as described in claim 8 wherein said cam member is provided with profile cam means engagable with means on said indicia forming member to move the same in a direction outwardly of the recess in response to rotation of said cam means from said latching position toward said unlatching position.

10. A tire mold as described in claim 9, wherein said profile cam means is provided by a curvilinear surface on said cam member, said indicia forming member being provided with a surface configured similarly to and engagable by said curvilinear surface.

11. A tire mold as described in claim 10 including a shaft carried by said mold member mounted for movement about its longitudinal axis, said cam member being fixed for movement with said shaft, and means for releasably retaining said shaft in a predetermined angular position corresponding to said latching position of said cam member.

* * * * *